United States Patent [19]

Rosenberg et al.

[11] 4,407,566
[45] Oct. 4, 1983

[54] OPTICAL FILTER

[75] Inventors: William J. Rosenberg; Alan M. Title, both of Palo Alto, Calif.

[73] Assignee: Lockheed Missiles & Space Co., Inc., Sunnyvale, Calif.

[21] Appl. No.: 306,691

[22] Filed: Sep. 29, 1981

[51] Int. Cl.³ .......................... G02B 5/28; G02B 5/30
[52] U.S. Cl. ..................................... 350/404; 350/166
[58] Field of Search ................. 350/385, 387–388, 350/392, 403–407, 166

[56] References Cited
PUBLICATIONS

Willisen, F. K. von, "A Tunable Birefringent Filter", App. Optics, 1-1966, pp. 97–104.
Nestrizhenko, Yu. A., "Total-Internal-Reflection Polarizer as an Interference-Polarization Filter for a Laser", Optics & Spectroscopy, 8-1974, pp. 186–189.
Schineller et al., "Development of a Wide-Angle Narrow-Band Optical Filter", Manf. Optican Intern., 9-968, pp. 148 & 148.

Primary Examiner—William H. Punter
Attorney, Agent, or Firm—John J. Morrissey

[57] ABSTRACT

A filter element for a narrow-passband optical filter comprises a birefringent crystal (10) having a rectangular parallelopiped configuration with an entrance face (11), an exit face (12) and side walls (21, 22, 23, 24). The optic axis (25) of the crystal (10) is parallel to the entrance and exit faces (11 and 12). The side walls (21, 22, 23, 24) are polished to provide total internal reflection of optical energy incident thereon at greater than a critical angle as measured from the normal. By covering the side walls (21, 22, 23, 24) with a coating whose index of refraction is given by the algorithm $n=(N^2-\sin^2\theta)^{\frac{1}{2}}$, where n is the index of refraction of the coating, N is the lower index of refraction of the crystal (10), and $\theta$ is a half-angle defining the maximum field of view in air for the filter element, the critical angle for total internal reflection is made substantially equal to the half-angle defining the maximum field of view. In this way, vignetting is suppressed and a wide field of view is obtained.

19 Claims, 3 Drawing Figures

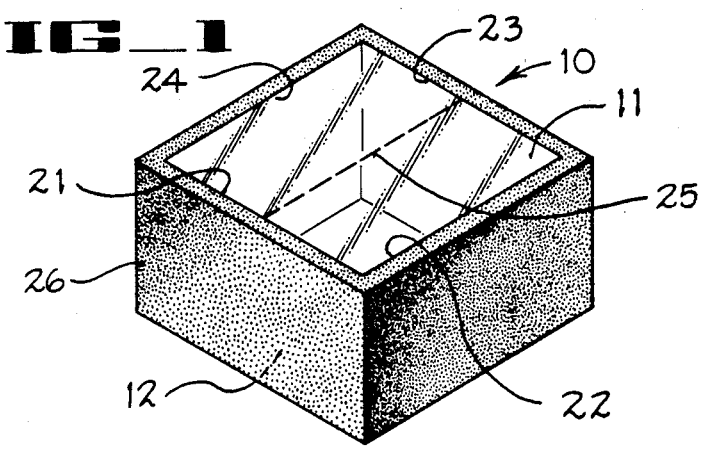
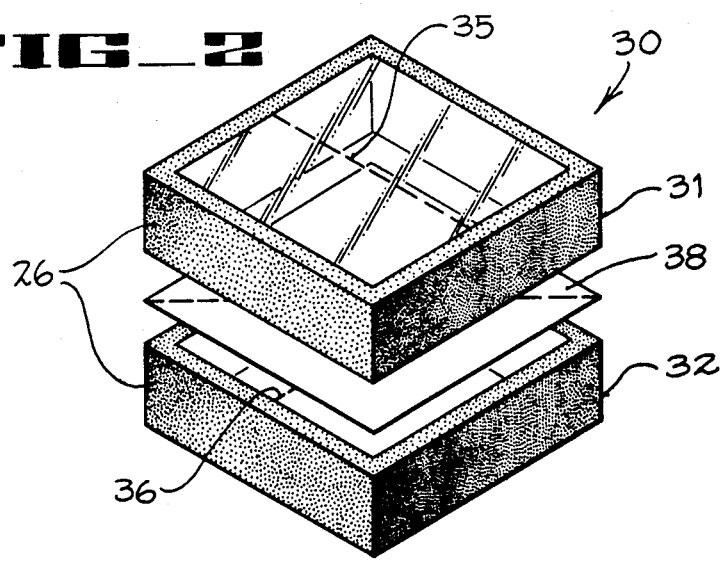
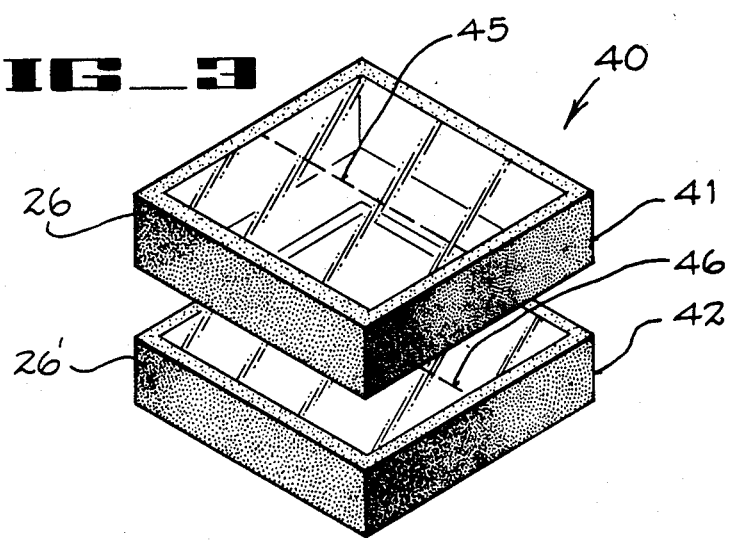

OPTICAL FILTER

The Government has rights in this invention pursuant to Contract N00014-78-C-0526 awarded by the Department of the Navy.

TECHNICAL FIELD

This invention relates generally to optical filters, and more particularly to narrow passband optical filter elements in which vignetting is suppressed.

Description of the Prior Art

In 1933, B. Lyot described a narrow passband optical filter for isolating a few widely separated narrow wavelength bands from white light. Compt. Rend., 197, 1593 (1933). A Lyot filter comprises a number of birefringent crystals, typically made of quartz or calcite, with each crystal having an entrance polarizer and an exit polarizer. The individual crystals are of different thicknesses, and are usually arranged in series so that the exit polarizer for one crystal also serves as the entrance polarizer for the next crystal in the series. Typically, the crystals in a Lyot filter are arranged so that the thicknesses of the crystals vary in inverse geometric progression along the direction of propagation of light through the filter.

For a Lyot filter in which each successive crystal is exactly half as thick as the immediately preceding crystal, every second transmission maximum for light transmitted through a given crystal coincides with a transmission minimum for the next successive crystal. Thus, every second transmission maximum passed through a given crystal is blocked from passing through the next crystal in the series. In effect, each successive crystal doubles the spectral spacing between transmission maxima, while changing the passband response only slightly from crystal to crystal. It is thereby possible with a Lyot filter to isolate a very few narrow wavelength bands from a beam of light. Unwanted wavelength bands passing through a Lyot filter can be removed by an ordinary color filter. As few as four birefringent crystals arranged in series in the manner described by Lyot are ordinarily enough to produce a polarizing filter that is sufficiently monochromatic for scientific and other purposes.

It was first shown by I. Solc in 1953 that a narrow passband optical filter can be constructed from a number of birefringent crystals of the same thickness and configuration arranged in series, without requiring polarizers between adjacent crystals. J. Opt. Soc. Am., 55, 621 (1965). In Solc filters, the individual crystals are typically stacked in either a "fanned" arrangement or a "folded" arrangement, with an entrance polarizer at one end and an exit polarizer at the other end of the stack. In the fanned arrangement, the crystals are stacked like a fanned deck of playing cards, with the orientations of the optic axes of successive crystals varying from the orientation of the optic axis of the entrance polarizer by the angles $\alpha, 3\alpha, 5\alpha, \ldots, (2n-1)\alpha$, respectively, where $\alpha = 45°/n$, and where n is the number of crystals in the series. The optic axes of the entrance and exit polarizers in the fanned arrangement are oriented parallel to each other at 0°. In the folded arrangement, the individual crystals are oriented alternately in succession at $+\alpha$ and $-\alpha$ with respect to the orientation of the optic axis of the entrance polarizer at 0°, and the optic axis of the next polarizer is oriented at 90°.

In recent years, various modifications on the basic Lyot and Solc filters, including hybrids, have been developed to provide refinements in finesse, tunability and elegance of construction. A review of the configurations and capabilities of certain variations on the basic filters described by Lyot and Solc is found in an article by William J. Rosenberg and Alan M. Title entitled "Tunable Birefringent Filters", which as published in *Optical Engineering*, Vol. 20, No. 6, Nov./Dec. 1981, pages 815–823.

The light flux transmitted through an optical filter (i.e., the filter's throughput) is usually of prime concern in an optical filter system. The throughput for any optical filter is inherently limited by the position and orientation of the filter relative to the solid angle of emission from the light source, and by the area of the entrance aperture of the filter. In the prior art, the throughput of a Lyot or Solc filter was further limited by a falling-off in intensity toward the margin of the exit aperture of the filter due to vignetting.

Only a fraction of the rays of light incident upon the entrance polarizer of a Lyot or Solc filter at any given non-zero angle of incidence, as measured from the normal to the entrance polarizer, can pass directly through the filter without striking the side wall of one of the crystals comprising the filter. For any given non-zero angle of incidence, the fraction of rays that can pass directly through the filter without impinging upon the crystal side walls decreases with increasing filter length. For a given filter length, the fraction of rays that can pass directly through the filter at each particular angle of incidence decreases as the angle of incidence increases. Until the present invention, the finite length of a Lyot or Solc filter in the direction of propagation of light through the filter caused vignetting (i.e., blocking by the side walls) of rays of light impinging upon the entrance polarizer at non-zero incidence.

For light rays impinging upon the entrance polarizer of an optical filter at a distribution of incidence angles measured from the normal, it is convenient to consider the total light transmitted through the filter as the sum of individual flux components attributable to corresponding individual angles of incidence. The intensities of the various flux components transmitted through the filter differ for the various angles of incidence, depending upon the extent of vignetting by the side walls of the filter crystals for each particular angle of incidence. Assuming that the intensity of the light impinging upon the entrance polarizer is substantially uniform over the distribution of incidence angles, the intensity of the flux components transmitted through the filter is highest for rays of normal incidence and decreases as the angle of incidence of the rays measured from the normal increases.

In the prior art, care was taken to prevent the rays of light impinging upon the side walls of the crystals of an optical filter from being reflected internally back into the crystals. Assuming that the light incident upon the entrance polarizer of an optical filter is completely unpolarized, the entrance polarizer passes one-half of the incident light into the crystals. The crystals thereupon block transmission of any "out-of-band" wavelengths, i.e., any wavelengths outside a particular passband or passbands determined by the nature and geometry of the crystals comprising the filter. The exit polarizer then allows only a fraction of the "in-band" wavelengths, i.e., wavelengths passed by the crystals, to be transmitted through the filter, viz., the flux components meeting certain phase conditions. In general, an optical filter selectively passes "in-band" wavelengths in a particular narrow passband or passbands on the basis of the phase difference between two orthogonal polarizations, i.e., the polarizations caused by the entrance and exit polarizers. However, any "out-of-band" wavelengths that might be reflected from the side walls back into the crystal would be likely upon reflection to undergo phase shifts, and thus be transmitted by the exit polarizer.

In the prior art, at least a portion of any "out-of-band" wavelengths reflected internally from the side walls of the crystals comprising an optical filter would be likely to be transmitted through the filter. Since an optical filter is ordinarily used in a system for measuring the intensity of radiation in a selected narrow passband emanating from a light source, any "out-of-band" wavelengths reflected from the side walls of the filter crystals would distort the intensity measurement for the passband of interest originating at the light source. In the prior art, in order to prevent such distortion of the intensity measurement, the reflection of light from the side walls of the crystals of an optical filter was inhibited.

In a Lyot or Solc filter of the prior art, the prevention of internal reflection from the side walls of the filter crystals also prevented measurement of the intensity of all the "in-band" radiation entering the filter from the light source being investigated. For a filter used to measure total flux in a selected narrow bandwidth emanating from a very faint or weak light source, the vignetting of rays entering the filter at non-normal incidence resulted in a serious diminution in filter sensitivity.

SUMMARY OF THE INVENTION

It is an object of the present invention to provide a filter element that substantially eliminates vignetting in an optical filter having a wide field and narrow passband.

It is a particular object of the present invention to provide a filter element comprising a single uniaxial birefringent crystal for use in an optical filter having a wide field and narrow passband, with the side walls of the crystal being treated so that vignetting is substantially eliminated.

It it also an object of this invention to provide an optical filter comprising one or more filter elements arranged in series, where each filter element is a uniaxial birefringent crystal whose side faces are optically polished and coated with a material to eliminate vignetting.

It is another particular object of the present invention to provide a filter element comprising two or more uniaxial birefringent crystals for use in an optical filter having a wide field and narrow passband, with the side walls of the crystals being treated so that vignetting is substantially eliminated.

It is likewise an object of this invention to provide an optical filter comprising a plurality of filter elements, each of which is configured and arranged to transmit optical energy in a relatively narrow passband while maintaining a relatively wide field of view without exhibiting significant vignetting. The individual filter elements of an optical filter according to the present invention may be of a single-crystal type, or of a type comprising two or more crystals. In accordance with this invention, the individual filter elements comprising the optical filter may be combined in conventional Lyot or Solc configurations, or hybrids thereof.

A birefringement crystal has the property of dividing a ray of light passing therethrough into an "ordinary" ray and a ray that is displaced or deviated from the ordinary ray. In general, the ray deviated from the ordinary ray (i.e., the "extraordinary" ray) emerges from the crystal parallel to but displaced from the ordinary ray to an extent that is determined by the angular orientation of the crystal about an axis parallel to the ordinary ray. For a uniaxial birefringent crystal, there is one particular orientation of the crystal relative to the direction of propagation of the incident ray for which the extraordinary ray and the ordinary ray coincide with each other when emerging from the crystal. This particular angular orientation defines the optic axis of the crystal.

A single-crystal filter element according to the present invention comprises a uniaxial birefringent crystal of rectangular parallelopiped configuration having an entrance face for receiving incident optical energy, an exit face for passing optical energy in a relatively narrow passband, and four side walls. Optical energy passing through the crystal in a direction perpendicular to the entrance and exit faces is attenuated by the crystal, but does not impinge upon the side walls. However, off-axis rays (i.e., rays entering the crystal through the entrance face at a non-zero angle of incidence with respect to the normal to the entrance face) impinge upon the side walls. One pair of side walls of the crystal is orthogonal to the optic axis, and all four side walls are optionally polished to provide total internal reflection of the off-axis rays impinging internally upon the side walls. It is a feature of the present invention that absorption of optical energy by the side walls of the crystal is minimal.

A uniaxial crystal possesses a symmetry that, in combination with the orthogonal orientation of one pair of side faces with respect to the optic axis of the crystal, causes incident and reflected rays within the crystal to be retardationally evident. Moreover, the relative phase difference introduced by reflection at the side walls of parallel and transverse optical polarizations is less for totally internally reflected rays than for externally reflected rays. The relative phase difference between the parallel and transverse polarizations is zero for internal grazing incidence and for incidence at a critical angle. In order to minimize the relative phase difference between the parallel and transverse polarizations for other angles of incidence, the critical angle of incidence for total internal reflection within the crystal is made as small as possible consistent with the operational field of view of the filter.

In accordance with the present invention, the critical angle of incidence for total internal reflection is made as small as possible by coating the side walls of the crystal with a material having an index of refraction that is related to the lower index of refraction of the crystal (i.e., the lower of the indices of refraction of the ordinary ray and the extraordinary ray in the crystal) by the algorithm:

$$n = (N^2 - \sin^2\theta)^{1/2}$$

where n is the index of refraction of the coating, N is the lower index of refraction of the crystal, and $\theta$ is the half-angle defining the maximum field of view in air for the filter.

BRIEF DESCRIPTION OF THE DRAWING

FIG. 1 is a perspective view of a single-crystal filter element for an optical filter in accordance with the present invention.

FIG. 2 is an exploded perspective view of a two-crystal filter element comprising a pair of birefringent crystals separated by a half-wave retardation plate.

FIG. 3 is an exploded perspective view of another two-crystal filter element for an optical filter in accordance with the present invention, where the crystals are a pair of aligned birefringent crystals without any retardation plate separating the crystals.

BEST MODE OF CARRYING OUT THE INVENTION

A single-crystal filter element according to the present invention, as illustrated in FIG. 1, comprises a uniaxial birefringent crystal 10 cut and polished in the shape of a rectangular parallelopiped. Ordinarily, a plurality of such filter elements would be combined to form an optical filter such as a Lyot or Solc filter of conventional design. In order to facilitate fabrication of such optical filters, each crystal 10 may be cut in the shape of a square parallelopiped for convenience in stacking the individual filter elements to make the optical filter.

The uniaxial birefringent crystal 10, which may be of e.g. calcite or quartz, has an entrance face 11 through which optical energy incident thereon is admitted, an exit face 12 through which optical energy in a particular passband is transmitted, and four side walls 21, 22, 23 and 24. The entrance face 11 is parallel to the exit face 12, and both the entrance and exit faces are perpendicular to the side walls 21, 22, 23 and 24. Due to the birefringent nature of the crystal 10, a ray of light incident upon the entrance face 11 is divided by the crystal 10 into an "ordinary" ray and an "extraordinary" ray. There is one particular angular orientation of the crystal 10 relative to the normal to the entrance and exit faces 11 and 12, respectively, for which the ordinary and the extraordinary rays coincide with each other. That unique angular orientation for which the ordinary and the extraordinary rays coincide defines the optic axis 25 of the crystal 10 as indicated by the broken line in FIG. 1.

For a single-crystal filter element as shown in FIG. 1, the opposing side walls 21 and 23 are perpendicular to the optic axis 25 and the opposing side walls 22 and 24 are parallel to the optic axis 25. The optic axis 25 is perpendicular to the general direction of propagation of light through the crystal 10. Rays of light incident normally (i.e., at 90°) upon the entrance face 11 are transmitted directly through the crystal 10 (with some attenuation of energy due to absorption by the crystal material), and do not impinge upon any of the side walls 21, 22, 23 and 24. However, some rays of light incident upon the entrance face 11 at non-normal incidence angles to impinge upon the side walls 21, 22, 23 and 24. For a given incidence angle, the overall portion of rays that impinge upon the side walls 21, 22, 23 and 24 depends upon the length of the side walls 21, 22, 23 and 24 in the general direction of light propagation through the crystal 10. For a given side wall length, the portion of rays that impinge upon the side walls 21, 22, 23 and 24 increases as the angle of incidence increases from 0° at normal incidence to 90° at grazing incidence.

In accordance with the present invention, it is a feature of the crystal 10 that the side walls 21, 22, 23 and 24 are surfaced to maximize internal reflection back into the crystal 10 of rays of light impinging upon the side walls 21, 22, 23, and 24. Accordingly, the side walls 21, 22, 23 and 24 are optically polished. In addition, the side walls 21, 22, 23 and 24 are coated with a material 26 that makes the critical angle of incidence for total internal reflection as small as possible consistent with the operational field of view required for the optical filter in which the filter element is to be used.

The field of view of each filter element is defined by a half-angle $\theta$ measured from a central axis normal to the entrance face of the filter element. Ordinarily, it is desirable for the half-angle $\theta$ to be as large as possible in order to enable as much light as possible to be received by the optical filter. The half-angle $\theta$ inherently becomes small as the length of the filter element increases. Also, the field of view for the optical filter as a whole decreases as the overall length of the stack of filter elements comprising the optical filter increases.

The index of refraction of a crystal is defined as the ratio of the velocity of light in vacuo to the velocity of light in the crystal. For a uniaxial birefringent crystal such as calcite or quartz, however, there are two indices of refraction, one referring to the velocity of the ordinary ray in the crystal and the other referring to the velocity of the extraordinary ray in the crystal. For calcite, the index of refraction for the extraordinary ray is the lower of the two indices of refraction. For quartz, the index of refraction for the ordinary ray is the lower of the two indices of refraction. The factor N in the above algorithm refers to the lower of the two indices of refraction for the particular kind of crystal used.

A particular filter element having a particular half-angle $\theta$, as determined by the requirements of the optical filter, can be made to have a small an angle as possible for total internal reflection from the side walls thereof by coating the side walls with a material having an index of refraction n that is related to the lower index of refraction N of the crystal by the algorithm:

$$n = (N^2 - \sin^2\theta)^{\frac{1}{2}}$$

as discussed in standard textbooks on physical optics, e.g., *Principles of Optics* by Born and Wolf, (1975 Edition), pp. 47–51. Such a coating material causes the critical angle for total internal reflection to be substantially equal to the half-angle $\theta$ defining the maximum field of view of the crystal.

The coating material 26 having the desired index of refraction n can be applied to the side walls 21, 22, 23 and 24 of the crystal 10 in relatively permanent form, as by vapor deposition or sputtering, or in temporary form as by smearing with a liquid or grease to enable an uncoated crystal to be used for a particular ad hoc purpose. The coating material 26 can be readily made from commercially available refractive index liquids. For particular purposes, the coating material 26 could comprise a mixture of materials blended to produce a material having the desired index of refraction. For most applications, it is anticipated that a refractive index liquid having the desired index of refraction can be selected from a catalog of products marketed, for example, by Cargille Laboratories, Inc. of Cedar Grove, New Jersey.

Multi-crystal filter elements are also possible according to the present invention. A two-crystal filter element 30 comprising individual crystals 31 and 32 is shown in FIG. 2. The crystals 31 and 32 are aligned with each other so that their optic axes 35 and 36, respectively, are oriented perpendicularly to each other. A half-wave retardation plate 38 is interposed between the crystals 31 and 32 to rotate the plane of polarization of the incident light. In comparison with the single-crystal filter element 10 of FIG. 1, the two-crystal filter element 30 has the advantage of an extended field of view.

Another type of two-crystal filter element in accordance with the present invention is shown in FIG. 3 in which the filter element 40 comprises individual crystals 41 and 42, which are aligned with each other so that their optic axes 45 and 46, respectively, are parallel to each other. There is no retardation plate or other optically significant element interposed between the crystals 41 and 42. In comparison with the single-crystal filter element 10 of FIG. 1, the two-crystal filter element 40 also has the advantage of an extended field of view. The crystals 41 and 42 are usually of different materials, so that different coating materials 26 and 26' are generally necessary for the side walls of the two crystals. The coating materials 26 and 26' are selected to have indices of refraction calculated to make the critical angle of incidence for total internal reflection in both crystals 41 and 42 as small as possible consistent with the desired field of view.

In general, for a filter element comprising a number of individual crystals each represented by a different reference number i, the index of refraction $n_i$ for the coating on the side walls of the $i^{th}$ crystal is given by the algorithm:

$$n_i = (N_i^2 - \sin^2\theta)^{1/2}, \text{ for } i = 1, 2, \ldots$$

Various configurations have been described herein for filter elements in accordance with the present invention, which recognizes that rays of light impinging internally upon the side walls of a crystal in an optical filter can be advantageously reflected back into the crystal without degrading spectral performance of the optical filter. The configuration and dimensions appropriate for a particular filter element depend upon the purpose of the optical filter in which the filter element is to be used, and perhaps also upon geometrical constraints imposed by the instrument or system of which the optical filter is a part. Regardless of configuration, all such filter elements are within the scope of the invention. Optical filters, whether of conventional or unconventional design, which comprise filter elements as described herein, are likewise within the scope of this invention. The invention is defined by the following claims and their equivalents.

We claim:

1. A filter element for an optical filter, said filter element comprising:
    (a) a birefringent crystal having a unique optic axis; said crystal having a rectangular parallelopiped configuration with an entrance face through which optical energy is received, an exit face through which optical energy in a particular passband is passed, and four side walls; said optic axis being parallel to said entrance and exit faces, each of said side walls being surfaced so as to cause optical energy incident upon any one of said side walls from within said crystal at an angle greater than a critical angle as measured from normal to said one of said side walls to undergo total internal reflection back into said crystal; and
    (b) a coating on each of said side walls, said coating having an index of refraction such as to cause said critical angle for total internal reflection of optical energy in said passband to be substantially equal to a half-angle defining a maximum field of view for said filter element.

2. The filter element of claim 1 wherein said crystal has a lower index of refraction and a higher index of refraction for optical energy of said passband, said lower index of refraction of said crystal being related to the index of refraction of said coating by an algorithm as follows:

$$n = (N^2 - \sin^2\theta)^{1/2}$$

where n is the index of refraction of said coating, N is the lower index of refraction of said crystal, and $\theta$ is the half-angle defining said maximum field of view in air for said filter element.

3. The filter element of claim 1 wherein said coating comprises a liquid material.

4. The filter element of claim 1 wherein said coating comprises a solid material.

5. The filter element of claim 2 wherein said coating comprises a mixture of materials blended to produce a resulting index of refraction in accordance with said algorithm.

6. A filter element for an optical filter, said filter element comprising:
    (a) a first birefringent crystal having a unique optic axis; said first crystal having a rectangular parallelopiped configuration with an entrance face through which optical energy is received, an exit face through which optical energy is passed, and four side walls; said optic axis of said first crystal being parallel to said entrance and exit faces of said first crystal and perpendicular to a pair of said side walls of said first crystal; said side walls of said first crystal being surfaced so as to cause optical energy incident upon any one of said side walls from within said first crystal at any angle greater than a critical angle as measured from normal to said one of said side walls to undergo total internal reflection back into said first crystal;
    (b) a half-wave retardation plate having a first surface aligned with the exit face of said first crystal, said retardation plate having an optic axis oriented at 45 degrees to the optic axis of said first crystal, said optic axis of said retardation plate being parallel to said first surface of said retardation plate;
    (c) a second birefringent crystal having a unique optic axis; said second crystal having a material composition substantially identical to said first crystal, and having an entrance face through which optical energy is received, an exit face through which optical energy in a particular passband is passed, and four side walls; said entrance face of said second crystal being aligned with a second face of said retardation plate; said optic axis of said second crystal being parallel to said entrance and exit faces of said second crystal and perpendicular to a pair of side walls of said second crystal; the optic axis of said second crystal being oriented at a right angle to the optic axis of said first crystal; said side walls of said second crystal being surfaced so as to cause optical energy incident upon any one of said side walls from within said second crystal at any angle greater than said critical angle to undergo total internal reflection back into said second crystal; and (d) a coating on each of the side walls of said first and second crystals, said coating having an index of refraction such as to cause said critical angle for total internal reflection of optical energy in said passband in said first and second crystals to be substantially equal to a half-angle defining a maximum field of view for said filter element.

7. The filter element of claim 6 wherein for optical energy in said passband said first and second crystals have a lower index of refraction and a higher index of refraction, said lower index of refraction of said crystals being related to the index of refraction of said coating by an algorithm as follows:

$$n = (N^2 - \sin^2\theta)^{1/2}$$

where n is the index of refraction of said coating, N is the lower index of refraction of said crystals, and $\theta$ is the half-angle defining said maximum field of view in air for said filter element.

8. The filter element of claim 6 wherein said coating comprises a liquid material.

9. The filter element of claim 6 wherein said coating comprises a solid material.

10. The filter element of claim 7 wherein said coating comprises a mixture of materials blended to produce a resulting index of refraction in accordance with said algorithm.

11. A filter element for an optical filter, said filter element comprising:

(a) a first birefringent crystal having a unique optic axis; said crystal having a rectangular parallelopiped configuration with an entrance face through which optical energy is received, an exit face through which optical energy is passed, and four side walls; said optic axis of said first crystal being parallel to said entrance and exit faces of said first crystal and perpendicular to a pair of said side walls of said first crystal; said side walls of said first crystal being surfaced so as to cause optical energy incident upon any one of said side walls from within said first crystal at any angle greater than a critical angle as measured from normal to said one of said side walls of said first crystal to undergo total internal reflection back into said first crystal;

(b) a first coating on each of the side walls of said first crystal, said first coating having an index of refraction such as to cause said critical angle for total internal reflection of optical energy in a particular passband in said first crystal to be substantially equal to a half-angle defining a maximum field of view for said filter element;

(c) a second birefringent crystal having a unique optic axis; said second crystal having a material composition different from said first crystal; said second crystal having an entrance face through which optical energy is received, an exit face through which optical energy in said particular passband is passed, and four side walls; said entrance face of said second crystal being aligned with said exit face of said first crystal; said optic axis of said second crystal being parallel to said entrance and exit faces of said second crystal and perpendicular to a pair of said side walls of said second crystal; the optic axis of said second crystal being parallel to the optic axis of said first crystal; said side walls of said second crystal being surfaced so as to cause optical energy incident upon any one of said side walls from within said second crystal at any angle greatr than a critical angle as measured from normal to said one of said side walls of said second crystal to undergo total internal reflection back into said second crystal; and (d) a second coating on each of the side walls of said second crystal, said second coating having an index of refraction such as to cause said critical angle for total internal reflection of optical energy in said particular passband in said second crystal to be substantially equal to a half-angle defining said maximum field of view for said filter element.

12. The filter element of claim 11 wherein each of said first and second crystals has a lower index of refraction and a higher index of refraction for optical energy in said passband, said indices of refraction depending upon the material composition of said first and second crystals, the lower index of refraction in each of said first and second crystals being related to the index of refraction of the corresponding one of said first and second coatings by an algorithm as follows:

$$n_i = (N_i^2 - \sin^2\theta)^{1/2}, \text{ for } i = 1, 2$$

where $n_1$ and $n_2$ are the indices of refraction of the first and second coatings respectively, $N_1$ and $N_2$ are the lower indices of refraction of the first and second crystals respectively, and $\theta$ is the half-angle defining said maximum field of view in air for said filter element.

13. The filter element of claim 11 wherein at least one of said first and second coatings comprises a liquid material.

14. The filter element of claim 11 wherein at least one of said first and second coatings comprises a solid material.

15. The filter element of claim 11 wherein at least one of said first and second coatings comprises a mixture of materials blended to provide a resulting index of refraction in accordance with said algorithm.

16. An optical filter comprising a plurality of filter elements, each filter element including:

(a) a birefringent crystal having a unique optic axis; said crystal having a rectangular parallelopiped configuration with an entrance face through which optical energy is received, an exit face through which optical energy in a particular passband is passed, and four side walls; said optic axis being parallel to said entrance and exit faces; each of said side walls being surfaced so as to cause optical energy incident upon any one of said side walls from within said crystal at an angle greater than a critical angle as measured from normal to said one of said side walls to undergo total internal reflection back into said crystal; and (b) a coating on each of said side walls, said coating having an index of refraction such as to cause said critical angle for total internal reflection of optical energy in said passband to be substantially equal to a half-angle defining a maximum field of view for said filter element.

17. The optical filter of claim 16 wherein each of said filter elements is of square parallelopiped configuration.

18. An optical filter comprising at least two filter elements, each of said two filter elements including:

(a) a first birefringent crystal having a unique optic axis; saif first crystal having a rectangular parallelopiped configuration with an entrance face through which optical energy is received, an exit face through which optical energy is passed, and four side walls; said optic axis of said first crystal being parallel to said entrance and exit faces of said first crystal and perpendicular to a pair of said side walls of said first crystal; said side walls of said first crystal being surfaced so as to cause optical energy incident upon any one of said side walls from within said first crystal at any angle greater than a critical angle as measured from normal to said one of said side walls to undergo total internal reflection back into said first crystal;

(b) a half-wave retardation plate having a first surface aligned with the exit face of said first crystal, said retardation plate having an optic axis oriented at 45 degrees to the optic axis of said first crystal, said optic axis of said retardation plate being parallel to said first surface of said retardation plate;

(c) a second birefringent crystal having a unique optic axis; said second crystal having a material composition substantially identical to said first crystal, and having an entrance face through which optical energy is received, an exit face through which optical energy in a particular passband is passed, and four side walls; said entrance face of said second crystal being aligned with a second face of said retardation plate; said optic axis of said second crystal being parallel to said entrance and exit faces of said second crystal and perpendicular to a pair of side walls of said second crystal; the optic axis of said second crystal being oriented at a right angle to the optic axis of said first crystal; said side walls of said second crystal being surfaced so as to cause optical energy incident upon any one of said side walls from within said second crystal at any angle greater than said critical angle to undergo total internal reflection back into said second crystal; and (d) a coating on each of the side walls of said first and second crystals, said coating having an index of refraction such as to cause said critical angle for total internal reflection of optical energy in said passband in said first and second crystals to be substantially equal to a half-angle defining a maximum field of view for said filter element.

19. An optical filter comprising at least two filter elements, each of said two filter elements including:

(a) a first birefringent crystal having a unique optic axis; said crystal having a rectangular parallelopiped configuration with an entrance face through which optical energy is received, an exit face through which optical energy is passed, and four side walls; said optic axis of said first crystal being parallel to said entrance and exit faces of said first crystal and perpendicular to a pair of said side walls of said first crystal; said side walls of said first crystal being surfaced so as to cause optical energy incident upon any one of said side walls from within said first crystal at any angle greater than a critical angle as measured from normal to said one of said side walls of said first crystal to undergo total internal reflection back into said first crystal;

(b) a first coating on each of the side walls of said first crystal, said first coating having an index of refraction such as to cause said critical angle for total internal reflection of optical energy in a particular passband in said first crystal to be substantially equal to a half-angle defining a maximum field of view for said filter element;

(c) a second birefringent crystal having a unique optic axis; said second crystal having a material composition different from said first crystal; said second crystal having an entrance face through which optical energy is received, an exit face through which optical energy in said particular passband is passed, and four side walls; said entrance face of said second crystal being aligned with said exit face of said first crystal; said optic axis of said second crystal being parallel to said entrance and exit faces of said second crystal and perpendicular to a pair of said side walls of said second crystal; the optic axis of said second crystal being parallel to the optic axis of said first crystal; said side walls of said second crystal being surfaced so as to cause optical energy incident upon any one of said side walls from within said second crystal at any angle greater than a critical angle as measured from normal to said one of said side walls of said second crystal to undergo total internal reflection back into said second crystal; and (d) a second coating on each of the side walls of said second crystal, said second coating having an index of refraction such as to cause said critical angle for total internal reflection of optical energy in said particular passband in said second crystal to be substantially equal to a half-angle defining said maximum field of view for said filter element.

* * * * *